（12）United States Patent
Bernert et al.

(10) Patent No.: US 6,358,368 B1
(45) Date of Patent: Mar. 19, 2002

(54) SUPPORT BEAM UNIT METHOD OF ADJUSTMENT FOR A SUPPORT BEAM UNIT

(75) Inventors: Richard Bernert, Giengen; Martin Kustermann; Christoph Henninger, both of Heidenheim; Martin Seliger, Stockach; Franz Fischer, Heidenheim, all of (DE)

(73) Assignee: Voith Sulzer Papiertechnik Patent, Heidenheim (DE)

( * ) Notice: Subject to any disclaimer, the term of this patent is extended or adjusted under 35 U.S.C. 154(b) by 0 days.

(21) Appl. No.: 09/650,446

(22) Filed: Aug. 29, 2000

(30) Foreign Application Priority Data

Aug. 30, 1999 (DE) .......................................... 199 41 191

(51) Int. Cl.⁷ .................................................. D21F 7/00
(52) U.S. Cl. ......................... 162/272; 162/199; 162/252
(58) Field of Search ................................ 162/199, 272, 162/273, 281, 336, 252; 118/123, 126, 261, 413; 15/256.51, 256.53; 100/162 B; 492/7

(56) References Cited

U.S. PATENT DOCUMENTS

| 3,749,054 | A | * | 7/1973 | Brezinski .................... 118/352 |
|---|---|---|---|---|
| 4,092,916 | A | * | 6/1978 | Link et al. ................... 100/174 |
| 4,299,162 | A | * | 11/1981 | Hartmann et al. ............ 100/43 |
| 4,487,122 | A | * | 12/1984 | George et al. ............... 101/153 |
| 4,520,723 | A | * | 6/1985 | Pav et al. .................... 100/162 |
| 4,907,528 | A | * | 3/1990 | Sollinger .................... 118/121 |
| 5,110,415 | A | * | 5/1992 | Boucher et al. ............. 162/281 |
| 5,117,093 | A | * | 5/1992 | Boissevain .................. 219/494 |
| 5,269,846 | A | * | 12/1993 | Eskelinene et al. ......... 118/100 |
| 5,356,519 | A | * | 10/1994 | Grabscheid et al. ........ 162/281 |
| 5,474,656 | A | * | 12/1995 | Brown et al. ............... 162/272 |
| 5,556,512 | A | * | 9/1996 | Graf ........................... 162/272 |
| 5,833,106 | A | * | 11/1998 | Harris ......................... 226/17 |
| 5,993,548 | A | * | 11/1999 | Madrzak et al. ............ 118/123 |

* cited by examiner

Primary Examiner—Peter Chin
Assistant Examiner—Eric Hug
(74) Attorney, Agent, or Firm—Taylor & Aust, P.C.

(57) ABSTRACT

A support bar unit for supporting at least one functional device in a machine for the production and/or the processing of a fiber material web includes a first partial support beam and a second partial support beam. The first partial support beam supports the functional device, while the first partial support beam is supported on the second partial support beam. Further, the first partial support beam surrounds the second partial support beam, at least sectionally.

40 Claims, 3 Drawing Sheets

SUPPORT BEAM UNIT METHOD OF ADJUSTMENT FOR A SUPPORT BEAM UNIT

BACKGROUND OF THE INVENTION

1. Field of the Invention

The invention relates to a support beam unit intended for the support of at least one functional unit in a machine for the production and/or the processing of a material web, specifically a paper or cardboard web.

2. Description of the Related Art

During the operation of machinery for the production and/or processing of a fiber material web, specifically a paper or cardboard web, functional units, such as for example metering devices, together with the support beams on which the functional units are mounted are subject to a multitude of different stresses. Mechanical stresses due to the ever present elasticity which exists in the materials used in the construction of the support beams or the functional units, i.e. steel, and thermal stresses caused by thermal expansions lead to deflections of the support beam and the functional unit. Such deflections cause irregularities in the progression of the process, thereby negatively influencing the process result.

A certain improvement with regard to the deflection of the support beam and the functional device may be achieved by appropriately locating or supporting the support beam which is supporting the functional unit. A support beam known from DE 296 00 016 U is supported at two locations, whereby these points of support are located in the longitudinal direction of the support beam, at a certain distance from the two ends of the support beam. To achieve an additional reduction in the support beam deflection, the support beam may be equipped with a compensating device, for example, pressure tubing extending along the interior of the supporting beam, parallel to its longitudinal axis. Based on the placement of the supporting beam as suggested in DE 296 00 016 U, a more favorable deflection line is achieved with regard to mechanical stress of the supporting beam. It is, however, a disadvantage that the suggested placement is unsuitable for supporting beams manufactured from materials having a low thermal expansion factor. Supporting beams manufactured from materials that offer thermal dimensional stability, for example, glass or carbon fiber reinforced synthetics, have hitherto proven to be insufficiently deflection resistant.

SUMMARY OF THE INVENTION

Therefore, the current invention provides a construction method enabling utilization of materials that offer thermal dimensional stability for the manufacture of supporting beams in the aforementioned types of machinery.

According to the current invention, a support beam unit for supporting at least one functional device in a machine for the production and/or processing of a fiber material web, specifically a paper or cardboard web, includes a first partial supporting beam and a second partial supporting beam. The first partial supporting beam supports the functional device and is supported on the second partial supporting beam. The first partial supporting beam surrounds the second supporting beam, at least sectionally.

The method of construction suggested by the current invention allows a division of the stability functionalities between the first and the second partial supporting beam. In one embodiment, the first partial supporting beam is manufactured from a thermally dimensionally stable material, for example, a fiber reinforced synthetic material, preferably fiber glass or carbon fiber reinforced synthetics. Meanwhile, the second partial supporting beam is configured so that, in addition to the thermal dimensional stability provided by the first partial supporting beam, the entire supporting beam unit also has the necessary mechanical rigidity and flexural strength.

The second partial supporting beam may be manufactured from steel, preferably rust-resistant steel and/or from a fiber reinforced synthetic material, preferably a glass fiber or carbon fiber reinforced synthetic material. Particularly when utilizing synthetic materials in the construction of the second partial supporting beam, a weight reduction can be achieved compared to conventional supporting beam construction, while attaining a sufficient flexural strength, due to the lower density of fiber reinforced synthetics.

In order to ensure longevity of the functional device under the conditions that are present in machinery for the production and/or processing of a fiber material web, it is advantageous to manufacture the functional unit from steel, preferably rust-resistant steel.

The generally limited space available in machinery of the aforementioned type can be utilized effectively if the longitudinal axes of the first partial support beam and the second partial support beam, at least in a non-deformed condition, are arranged essentially parallel to each other in an area of mutual extension.

A further improvement in the dimensional stability of the support beam unit is possible by supporting the first partial supporting beam on the second partial supporting beam on at least two supports which are arranged in longitudinal direction of the first partial support beam, preferably always at a predetermined distance from each end face of the first partial supporting beam. By supporting the first partial supporting beam on the second partial supporting beam in this manner, a favorable deflection characteristic of the first partial supporting beam can be achieved.

Particularly, with a uniform load on the support beam unit and the functional device supported on it, across the working width of the material web, as is desirable in machinery for the production and/or processing of material webs, it can be advantageous that the two or more supports are located symmetrically to the longitudinal center of the first partial supporting beam in longitudinal direction of the first supporting beam. By arranging the support locations symmetrically, identical support forces occur at the support locations due to a constant load across the working width of the material web, resulting in a symmetrical and thereby generally uniform load upon the entire supporting beam unit. This, in turn, has a positive effect on the process result. It has been proven to be especially effective if the distance of at least one of the supports from the allocated face end of the first partial supporting beam is between approximately 15% and approximately 30%, preferably approximately 25% of the length of the first partial supporting beam. It is, however, also feasible to arrange the supports asymmetrical relative to the longitudinal center.

In consideration of a load situation that is changeable, locally and/or chronologically, an adjustment of the supporting situation of the first partial supporting beam on the second partial supporting beam may be desirable according to prevailing load situation. For this purpose, the position of one or more of the supports may be adjustable transversely to the material web. A control device that is one or more of mechanically, electrically, and fluidly adjustable may be provided to allow for such an adjustment.

When considering a load dependent deflection line, both the line progression and the maximum deviation of the deformed profile from the desired profile occurring at one point are factors. This maximum deflection can be reduced by supporting the first partial supporting beam with one or more pairs of supports on the second partial supporting beam.

The fundamental principle of this type of support is already known, for example, from DE 196 136 184 A1. This prior publication describes the reduction in the deflection of a beam by use of absorbing forces at two separately configured rigid frames, whereby each of these is supported by a pair of supports at one end of the beam. However, it is not clear exactly at what location on the beam and frame unit the forces originating from a functional unit and the forces originating from the support on a machinery frame will act. It is, however, disadvantageous in every instance that the actual support includes two additional components which are manufactured separately and which must be installed keeping within low error tolerances. In comparison, the design principle of the current invention provides only one unit, that is the unit created by the two partial supporting beams.

As is the case with the two or more supports and depending on the load requirements, the two or more support pairs may also be located in the longitudinal direction of the first partial supporting beam and symmetrically to the longitudinal center of the first partial supporting beam. As previously described, a completely uniform load may be supplied to the support beam unit, for example, in the instance of a constant load across the working width of the material web. Depending on each specific load situation, the deflection line of the first partial support beam may be positively influenced by positioning the two supports of the one or more support pairs relative to the longitudinal axis of the first partial support beam, essentially at the same longitudinal position or at different longitudinal positions.

During operation the support beam unit must, on the one hand, be able to be supported securely and, on the other hand, be able to be positioned and/or aligned precisely. Therefore, one or more of the supports may be designed and/or arranged so that it can transfer forces and/or moments from the first partial support beam to the second partial support beam, and vice versa. This relates especially to the transfer of forces from the functional device in the direction of the moving background, as well as transfer of moments around the longitudinal direction of the first partial support beam, since forces and/or moments in these flow directions favor the adjustment of the functional device mounted on the supporting beam relative to the moving background.

In this context it can be desirable to prevent a distortion of the first partial support beam and the second partial support beam relative to each other in order to achieve high stability, in combination with the heretofore described precise positioning and orientational capabilities. In general terms this may relate to a distortion of the first partial support beam relative to the second partial support beam in all three directions in space. Since a distortion of the first partial supporting beam relative to the second partial supporting beam around its longitudinal axis has particularly undesirable effects on the process result, one will generally give priority to attempting to avoid this type of distortion.

In addition to static and quasi-static loads, dynamic loads such as vibrational forces may affect the supporting beam unit during operation. In order to improve or guarantee the process result, one or more support may include one or more damping elements. The damping element, which would preferably be manufactured from a synthetic material, may, for example, serve to reduce or suppress irregularities such as shocks and vibrations in the flow direction between the first partial support beam and the second partial support beam, thereby improving the positional stability of the first partial support beam carrying the functional device, relative to outside influences.

To avoid overloading of the damping element, one or more supports can each include one or more elements which, in relation to the elasticity of the damping element, is essentially rigid and which works together with the damping element for the support of the first partial support beam on the second partial support beam. For example, the damping element and the rigid element can be arranged side be side so that support of the first partial support beam on the second partial support beam initially occurs through the damping element and, following a certain marginal deformation of this damping element, occurs through the rigid element.

As previously mentioned, the repositioning or reorientation of the support beam unit can be expediently accomplished if the second partial support beam is mounted so that it can be rotated and/or pivoted around an axis that is located essentially parallel to the longitudinal axis of the first partial support beam. Since the repositioning of the support beam unit also results in repositioning of the functional device, the rotational and/or pivoting axis of the second partial support beam may essentially coincide with an adjustment line along which the functional device is adjusted relative to the moving background in order to obtain adjustment kinematics favorable to the function of the general arrangement. The functional device may be a metering unit, for example, a doctor blade, a metering rod and/or an air brush. If, for example, the functional unit is a doctor blade, it would be advantageous if the adjustment line progresses through the tip of the doctor blade.

Efficient utilization of the available space can be achieved if one end each of the second partial support beam rests on the operator side and the drive side of the machine.

To compensate for load related deformations in the supporting beam unit, as well as for the targeted adjustment of the operational conditions, such as, for example, the adjustment angle and pressure, the supporting beam unit may work together with one or more adjustment or positioning devices. Advantageously, the adjustment and positioning device operates together only with the second partial supporting beam, so as not to directly load additional adjustment forces on the first partial supporting beam carrying the functional device.

With a view to testing, maintenance and repairs, as well as for the purpose of mounting of functional elements on the second partial supporting beam, the first partial supporting beam may be equipped with openings in its longitudinal direction, through which the second partial supporting beam may be accessed. Such an opening would permit, for example, a control element for the adjustment and/or positioning device to work together with the second supporting beam in the area of its longitudinal center or in the area of at least one support location. Depending on the specific load situation and available space, this would ensure favorable development of a force of the positioning and/or adjustment device upon the second partial supporting beam. However, it is also feasible that an influence of an adjustment and/or positioning device control element upon the aforementioned locations is not desirable or possible. In such an instance a control element of this type could then work together with the second partial support beam in the area of one or more of its support locations. A control element could then, if necessary, through gearing, introduce a torque into the second partial support beam at its support location, to rotate it around an axis through both support locations of the second partial support beam. Movable support of the second partial supporting beam is also feasible, creating the possibility of compensating deformation of the support beam unit not only with respect to rotation but also translational motion.

In order to achieve a supporting beam unit with high mechanical stability that has a total weight that is as low as possible, the second partial supporting beam may be tubular, at least in sections thereof. Additionally, the outer profile of the second partial supporting beam may be approximated to the inside profile of the first partial supporting beam, at least in the area of common extension, in order to improve the rigidity of the arrangement.

Compensation of load related supporting beam unit deformations can be simplified considerably or even automated if the adjustment and/or positioning device also includes a data acquisition device to record a displacement of the functional unit resulting from deflection of the second partial support beam; as well as a plotting unit which, based on the signals recorded by the acquisition device, determines actuating signals for the one or more control elements. An effective and precise compensation of the load-related support beam deformations is, for example, possible if the adjustment and/or positioning unit includes a device for measuring operational conditions which would measure the actual operational condition of the machine, for example, based on parameters of machine speed and line compression of the functional unit, the support beam unit and/or similar units and the plotting unit can continue to determine an actuating signal for the one or more control elements, based on the operational condition that was measured by the operational condition measuring device.

A suitable method for controlling the position and/or orientation of the support beam unit may include the following steps:

measuring the displacement of the functional unit due to deflection of the second partial support beam by using a measuring device;

determining actuating signals by using a plotting device and using the signals acquired by the measuring device; and positioning the support beam unit according to the determined actuating signals.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF THE INVENTION

Figure 1:
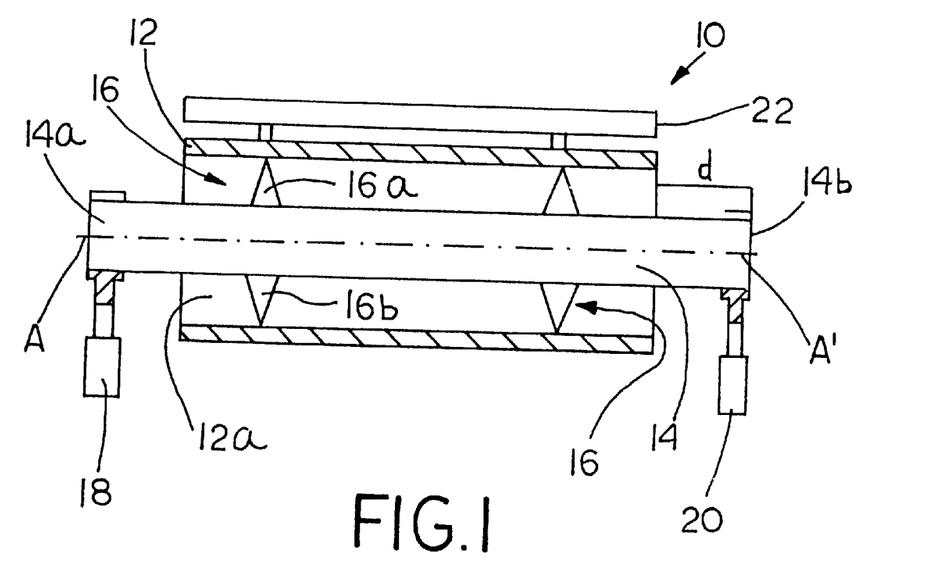
FIG. 1 is a schematic cross section of a support beam unit according to the current invention, shown in no-load condition.

In FIG. 1 a support beam unit 10, according to the current invention is part of a machine for the production and/or processing of a fiber material web, specifically a paper or cardboard web. Supporting beam unit 10 includes a first partial support beam 12 and a second partial support beam 14. First partial support beam 12 is supported on second partial support beam 14 by two support pairs 16. First partial support beam 12 is located symmetric to the longitudinal center of second partial support beam 14 so that its longitudinal axis A' essentially coincides with longitudinal axis A of second partial support beam 14 and so that first partial support beam 12 surrounds second partial support beam 14. A functional unit 22, which is illustrated schematically here and is, for example, a metering device, such as a doctor blade having a blade tip, may be supported on first partial support beam 12.

Second partial support beam 14 is positioned on pillow blocks 18, 20 at the two ends 14a and 14b thereof which both protrude at a predetermined distance d from interior 12a of first partial support beam 12.

Pillow block 18 is located on the operator side of the machine for production and/or processing of a fiber material web and pillow block 20 is located on the drive side thereof. Two support pairs 16 are located symmetrically to the longitudinal center of second partial support beam 14, inside the longitudinal extension of first partial supporting beam 12 and each include one support 16a and 16b. Supports 16a and 16b of each support pair 16 are located at the same longitudinal positions relative to longitudinal axis A of second partial support beam 14.

Figure 2:
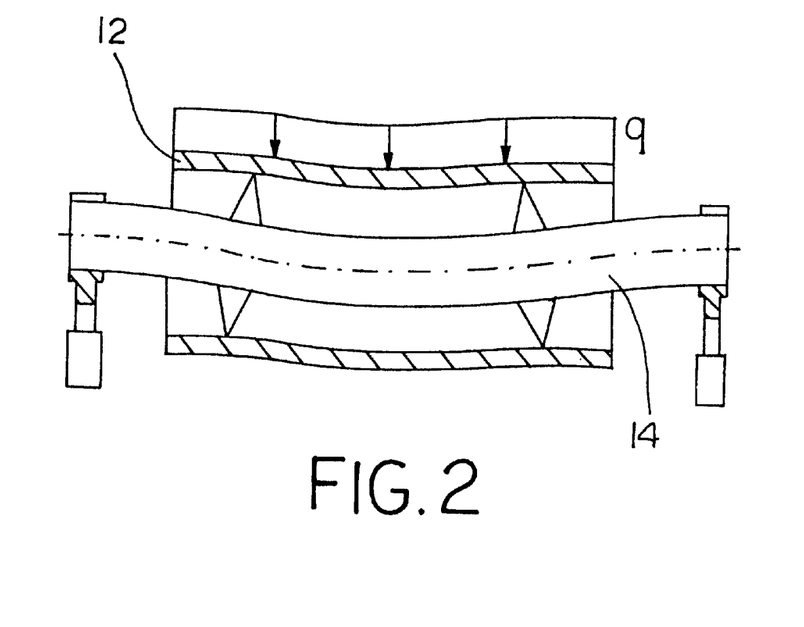
FIG. 2 is a schematic cross section of a support beam unit according to the current invention, shown in loaded condition.

FIG. 2 illustrates supporting beam unit 10 according to FIG. 1 in deformed condition caused by placing constant line load q on first partial support beam 12. An exaggerated illustration of the effect in FIG. 2 shows that the deformations of first partial support beam 12 and second partial support beam 14 conspire so that constant line load q causes only insignificant deformations on first partial support beam 12.

The mounting positions of second partial support beam 14 are located outside the machine width, resulting in a lower space requirement inside the machine width. Due to the greater support distance of pillow blocks 18, 20 the tendency of first partial support beam 12 to deflect under external load is increased. Due to the location of supports 16 between first partial support beam 12 and second partial support beam 14, a favorable deflection line of first partial support beam 12 is maintained despite the deflection of second partial support beam 14.

Figure 3:
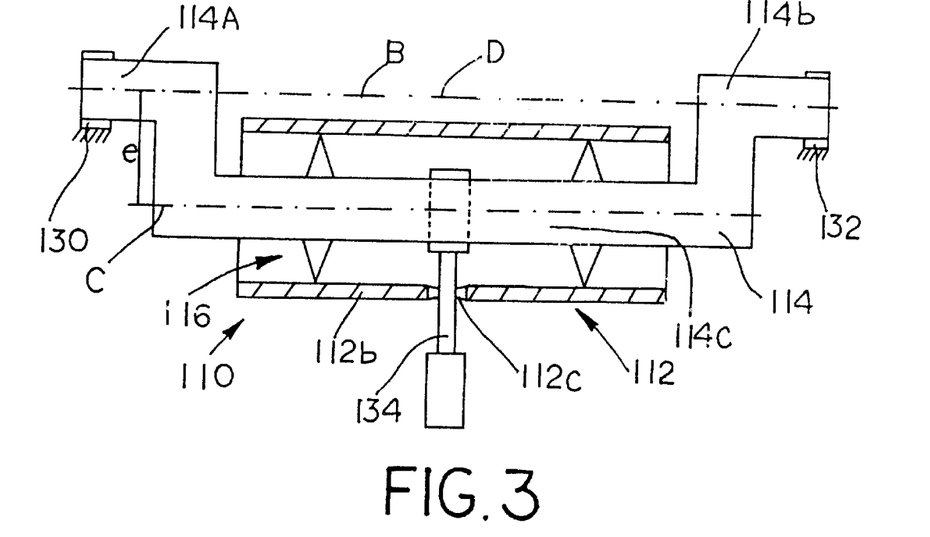
FIG. 3 is a schematic cross section of another embodiment of a support beam unit according to the invention, with an adjustment device, shown in no-load condition.

FIG. 3 illustrates another embodiment of a support beam unit according to the current invention which is essentially similar to that in FIG. 1. Therefore, similar components are designated with the same references as in FIG. 1, however increased by 100. Furthermore, the embodiment according to FIG. 3 is described below only in as far as it differs from the embodiment according to FIG. 1 to the description of which we otherwise specifically refer to.

FIG. 3 shows a first partial support beam 112 mounted over two support pairs 116 on an off-set second partial support beam 114. Second partial support beam 114 has an operator side end section 114a, a drive side end section 114b and a center section 114c off-set transversely to common longitudinal axis B of end sections 114a, 114b by a distance of e. Longitudinal axis C of center section 11c of second partial support beam 114 is positioned parallel to common longitudinal axis B of end sections 114a, 114b. Second partial support beam 114 is mounted at its two end sections 114a, 114b in a operator side pillow block 130 and a drive side pillow block 132 around a rotating axis D, whereby rotating axis D essentially coincides with common longitudinal axis B of end sections 114a, 114b of second partial support beam 114. In addition, a functional unit, for example a metering device, may be mounted on first partial support beam 112 in such a way that its contact line with a moving background coincides with rotating axis D of support beam unit 110.

First partial support beam unit 112, which is mounted on center section 114c, features an opening 112c on face 112b which is located away from the support locations of second partial support beam 114. A control element 134 of an adjustment and positioning unit (not illustrated) which is connected with second partial support beam 114 in the area of its longitudinal center 114c and with which it works together reaches through opening 112c.

Figure 4:
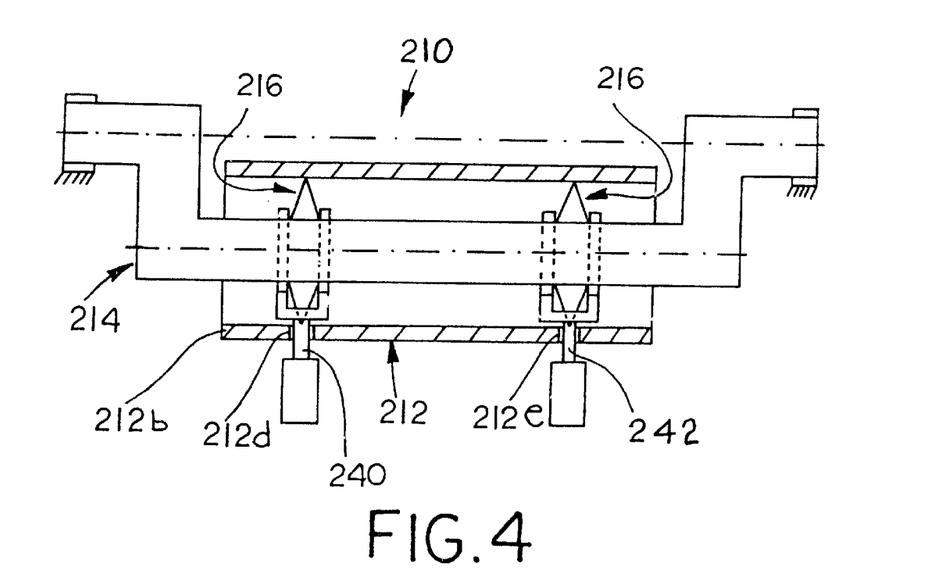
FIG. 4 is a schematic cross section of one embodiment of a support beam unit according to the current invention, illustrating another adjustment device arrangement, shown in no-load condition.

FIG. 4 illustrates another embodiment of support beam unit 210 according to the invention, which is essentially similar to the one in FIG. 3. For this reason similar parts are designated with the same references as in FIG. 3, however further increased by 100. Also, the embodiment according to FIG. 4 is described below only to the extent to which it differs from the embodiment according to FIG. 3, to the description for which we otherwise specifically refer to.

The embodiment illustrated in FIG. 4 depicts a support beam unit 210 including a first partial support beam 212 featuring two openings 212d, 212e on face 212b which are located away from the support locations of second partial support beam 214 and which are each located in the area of support pair 216 supporting first partial support beam 212. Through these openings 212d, 212e, control elements 240, 242 are connected with second partial support beam 214 in the area where first partial support beam 212 is supported on second partial support beam 214 with which they work together.

Figure 5:
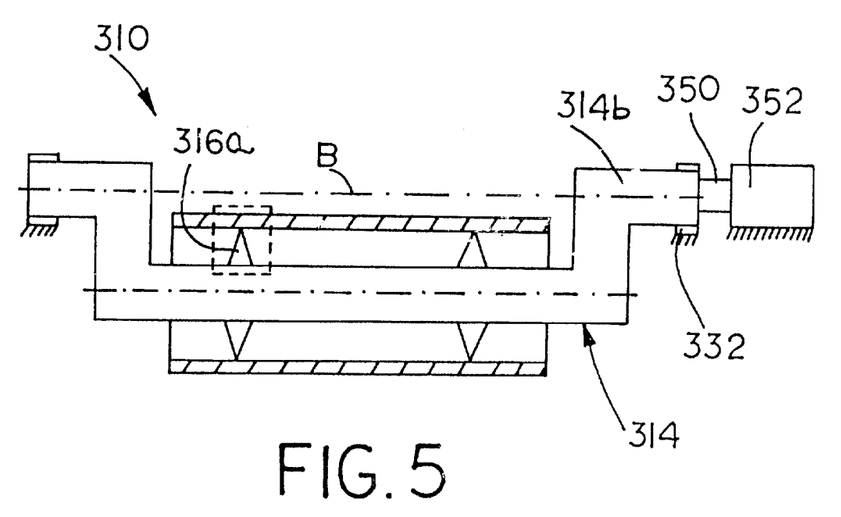
FIG. 5 is a schematic cross section of one embodiment of a support beam unit according to the current invention with another alternative adjustment device arrangement, shown in no-load condition.

FIG. 5 also illustrates another embodiment of a support beam unit according to the invention which is essentially similar to that illustrated in FIG. 4. For this reason similar parts are designated with the same references as in FIG. 4, however increased by 100. Also, the embodiment according to FIG. 5 is described below only to the extent to which it differs from the embodiment according to FIG. 4, to the description for which we otherwise specifically refer to.

FIG. 5 illustrates an embodiment of a support beam unit 310 according to the current invention in which a torque to alter the angle position and/or adjustment force of support beam unit 310, for example, relative to a moving background, is introduced into second partial support beam 314 in the area of its drive side mounting. For this purpose a shaft 350 of a servo motor 352 is connected concentrically relative to its axis of rotation B, with the end section of second partial support beam 314.

Figure 6:
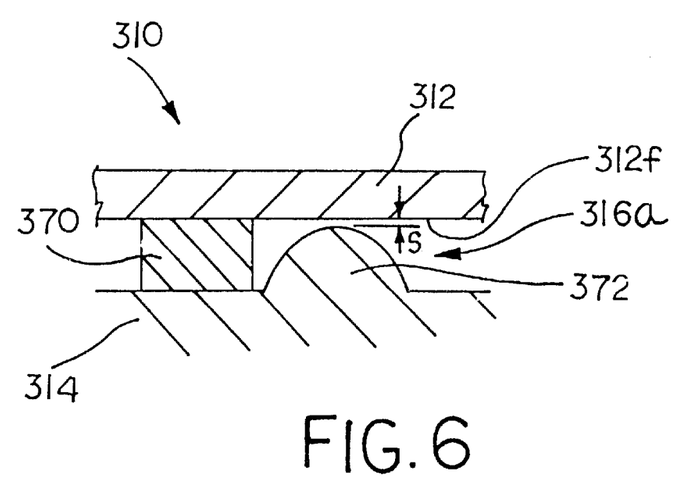
FIG. 6 is a schematic detailed cross section of the support illustrated in FIG. 5.

FIG. 6 details the area of a support 316a which is illustrated in FIG. 5 by broken lines. First partial support beam 312 is supported on second partial support 314 on a damping element 370 which is located between first partial support beam 312 and second partial support beam 314. Damping element 370 may, for example, be manufactured from polyurethane.

Second partial support beam 314 features a protrusion which, originating at second partial support beam 314 extends in direction of interior wall 312f of the first partial support beam 312. However, it does not make contact with it, so that a gap having a gap height of s remains between protrusion 372 and interior wall 312f. If damping element 370 is compressed by gap height s by a force affecting partial support beam 312, then protrusion 312 comes into contact with interior wall 312f of first partial support beam 312, thereby taking on a supporting function. Because of the material-related lower elasticity of protrusion 372 relative to damping element 370, protrusion 372 is able to absorb considerably higher loads than damping element 370. This results in a support 316a having a generally good damping effect at high load tolerances.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A support beam unit for receiving at least one functional device in a machine for at least one of producing and processing a fiber material web, said support beam comprising:
   a first partial support beam;
   a second partial support beam, said second partial support beam being surrounded at least sectionally by said first partial support beam, said second partial support beam having a longitudinal direction and an associated longitudinal center;
   a plurality of support pairs providing support to said first partial support beam from said second partial support beam, each of said support pairs being located between and substantially perpendicular to the surface of said first partial support beam and said second partial support beam, each support of each said support pair being located on opposite sides of said second partial support beam; and
   a control element coacting with said second partial support beam in a vicinity of said longitudinal center.

2. The support beam unit of claim 1, wherein said first partial support beam is comprised of a fiber reinforced synthetic material.

3. The support beam unit of claim 2, wherein said fiber reinforced synthetic material includes at least one of fiber glass and carbon fibers.

4. The support beam unit of claim 1, wherein said second partial support beam is comprised of at least one of a fiber reinforced synthetic material and steel.

5. The support beam unit of claim 4, wherein said fiber reinforced synthetic material includes at least one of fiber glass and carbon fibers.

6. The support beam unit of claim 4, wherein said steel is a rust-resistant steel.

7. The support beam unit of claim 1, wherein said support beam unit further comprises a functional device mounted thereto, said functional device being comprised of steel.

8. The support beam unit of claim 7, wherein said steel is a rust-resistant steel.

9. The support beam unit of claim 1, wherein said first partial support beam has a first longitudinal axis and said second partial support beam has a second longitudinal axis, said first longitudinal axis being arranged essentially parallel to said second longitudinal axis, at least in a non-deformed condition in an area of mutual extension therebetween.

10. The support beam unit of claim 1, wherein said first partial support beam has a pair of end faces, at least two of said supports each being at a predetermined distance from a respective said end face.

11. The support beam unit of claim 10, wherein said predetermined distance is approximately between 15% and 30% of a length of said first partial support beam.

12. The support beam unit of claim 11, wherein said predetermined distance is approximately 25% of the length of said first partial support beam.

13. The support beam unit of claim 10, wherein said predetermined distance of at least one of said supports is adjustable.

14. The support beam unit of claim 13, wherein each said at least one support having an adjustable predetermined distance has an adjustable control device associated therewith, each said control device being adjustable at least one of mechanically, electrically, and fluidly.

15. The support beam unit of claim 1, wherein said first partial support beam has a longitudinal axis, both supports in each said support pair being located at essentially a same longitudinal position along said longitudinal axis.

16. The support beam unit of claim 1, wherein said first partial support beam has a longitudinal axis, both supports in each said support pair being located at different longitudinal positions along said longitudinal axis.

17. The support beam unit of claim 1, wherein at least one of said supports is at least one of structured and arranged so that at least one of forces and moments are transferred between said first partial support beam and said second partial support beam.

18. The support beam unit of claim 1, wherein said first partial support beam and said second partial support beam are structured and arranged so that a distortion of said first partial support beam is substantially prevented.

19. The support beam unit of claim 1, wherein at least one of said supports comprises a damping element.

20. The support beam unit of claim 19, wherein each said damping element is comprised of a synthetic material.

21. The support beam unit of claim 19, wherein each said damping element has an elasticity, each said at least one of said supports further comprises an element, each said element being essentially rigid in relation to the elasticity of each said damping element, each said element coacting with a corresponding damping element to support said first partial support beam on said second partial support beam.

22. The support beam unit of claim 1, wherein said first partial support beam has a first longitudinal axis, said second partial support beam being mounted on a second axis, said second axis being located essentially parallel to said first longitudinal axis, said second partial support beam being capable of at least one of rotating and pivoting upon said second axis.

23. The support beam unit of claim 1, wherein said support beam unit further comprises a functional unit, said functional unit being a metering device.

24. The support beam unit of claim 23, wherein said metering device is at least one of a metering rod and a doctor blade.

25. The support beam unit of claim 1, wherein said support beam unit further comprises a functional device, said functional device having an adjustment line along which said functional device is adjusted relative to a moving background, said functional device comprising a doctor blade having a blade tip, said adjustment line progressing through said blade tip.

26. The support beam unit of claim 1, wherein said second partial support beam has first end corresponding to an operator side of the machine and a second end corresponding to a drive side of the machine, said second partial support beam being configured to have said first end rest on the operator side and to have said second end rest on the drive side.

27. The support beam unit of claim 1, further comprising at least one device for at least one of positioning and adjusting said second partial support beam.

28. The support beam unit of claim 27, wherein each said at least one device for at least one of positioning and adjusting said second partial support beam comprises a control element, said second partial support beam has a longitudinal direction and an associated longitudinal center, each said control element coacting with said second partial support beam in a vicinity of said longitudinal center.

29. The support beam unit of claim 27, further comprising at least two supports, each said support supporting said first partial support beam on said second partial support beam, each said support being positioned at a respective support location, and further wherein each said at least one device for at least one of positioning and adjusting said second partial support beam comprises a control element, each said control element coacting with said second partial support beam in the vicinity of one said respective support location.

30. The support beam unit of claim 27, further comprising at least two supports, each said support supporting said first partial support beam on said second partial support beam, each said support being mounted to said second partial support beam at a respective mounting support location, and further wherein each said at least one device for at least one of positioning and adjusting said second partial support beam comprises a control element, each said control element coacting with said second partial support beam in the vicinity of one said respective mounting support location.

31. The support beam unit of claim 1, wherein at least sections of said second partial support beam are tubular.

32. The support beam unit of claim 1, wherein said second partial support beam has an outside profile and said first partial support beam has an interior profile, said first partial support beam and said second partial support beam having an area of common extension, said outside profile approximating said interior profile at least in said area of common extension.

33. A support beam unit for receiving at least one functional device in a machine for at least one of producing and processing a fiber material web, said support beam comprising:

a first partial support beam, said first partial support beam having a first longitudinal axis;

a second partial support beam, said second partial support beam being surrounded at least sectionally by said first partial support beam, said second partial support beam being mounted on a second axis, said second axis being located essentially parallel to said first longitudinal axis, said second partial support beam being capable of at least one of rotating and pivoting upon said second axis;

a plurality of support pairs providing support to said first partial support beam from said second partial support beam, each of said support pairs being located between and substantially perpendicular to the surface of said first partial support beam and said second partial support beam, each support of each said support pair being located on opposite sides of said second partial support beam; and a functional device having an adjustment line along which said functional device is adjusted relative to a moving background, said second axis essentially coinciding with said adjustment line.

34. A support beam unit for receiving at least one functional device in a machine for at least one of producing and processing a fiber material web, said support beam comprising:

a first partial support beam has a longitudinal direction, said first partial support beam being equipped with openings in said longitudinal direction, a second partial support beam, said second partial support beam being surrounded at least sectionally by said first partial support beam, said second partial support beam being accessible via said openings; and a plurality of support pairs providing support to said first partial support beam from said second partial support beam, each of said support pairs being located between and substantially perpendicular to the surface of said first partial support beam and said second partial support beam, each support of each said support pair being located on opposite sides of said second partial support beam.

35. A support beam unit for receiving at least one functional device in a machine for at least one of producing and processing a fiber material web, said support beam comprising:

a first partial support beam;

a second partial support beam, said second partial support beam being surrounded at least sectionally by said first partial support beam;

a plurality of support pairs providing support to said first partial support beam from said second partial support beam, each of said support pairs being located between and substantially perpendicular to the surface of said first partial support beam and said second partial support beam, each support of each said support pair being located on opposite sides of said second partial support beam;

a functional unit; and at least one device for at least one of positioning and adjusting said second partial support beam, each said device including:
at least one control element;
a data acquisition device for recording a displacement of said functional unit resulting from a deflection of said second partial support beam; and
a plotting unit for receiving signals recorded by said data acquisition device and using said signals to thereby determine at least one actuating signal for said at least one control element.

36. The support beam unit of claim 35, wherein each said device for at least one of positioning and adjusting further comprises a measuring device for measuring at least one actual operating condition of the machine, said plotting unit being further configured to use the at least one measured operating condition to determine the at least one actuating signal for said at least one control element.

37. The support beam unit of claim 36, wherein the at least one measured operating condition is at least one of machine speed and line compression of at least one of said functional unit and said support beam unit.

38. A method of controlling at least one of a position and orientation of a support beam unit, said support beam unit for receiving at least one functional device in a machine for at least one of producing and processing a fiber material web, said support beam unit including:

a first partial support beam;

a second partial support beam, said second partial support beam being surrounded at least sectionally by said first partial support beam;

a plurality of support pairs providing support to said first partial support beam from said second partial support beam, each of said support pairs being located between and substantially perpendicular to the surface of said first partial support beam and said second partial support beam, each support of each said support pair being located on opposite sides of said second partial support beam;

a functional unit mounted to said first partial support beam; and at least one device for at least one of positioning and adjusting said support beam unit, each said at least one device for at least one of positioning and adjusting including a control element, said control method comprising the steps of:

using an acquisition device to measure a displacement of said functional unit due to a deflection of said second partial support beam;

generating at least one measurement signal based upon said measured displacement;

using a plotting device to determine at least one actuating signal based upon said at least one measurement signal; and positioning said support beam unit according to said at least one actuating signal.

39. Method of controlling the forces upon a second partial beam of a support beam unit, said support beam unit for receiving at least one functional device in a machine for at least one of producing and processing a fiber material web, said support beam unit including:

a first partial support beam;

a second partial support beam, said second partial support beam being surrounded at least sectionally by said first partial support beam;

a plurality of support pairs providing support to said first partial support beam from said second partial support beam, each of said support pairs being located between and substantially perpendicular to the surface of said first partial support beam and said second partial support beam, each support of each said support pair being located on opposite sides of said second partial support beam;

a functional unit mounted to said first partial support beam; and at least one device for at least one of positioning and adjusting said support beam unit, each said at least one device for at least one of positioning and adjusting including a control element, said control method comprising the steps of:

using an operational condition measuring device to determine at least one operational condition of said support beam unit;

using an evaluation device to determine at least one actuating signal for at least one said control element, said evaluation device basing said determination upon said at least one operational condition; and adjusting an additional force applied by at least one said control element according to said at least one actuating signal.

40. The control method of claim 39, wherein each said operational condition is one of machine speed, line compression of said functional unit and beam position.

* * * * *

UNITED STATES PATENT AND TRADEMARK OFFICE
CERTIFICATE OF CORRECTION

PATENT NO. : 6,358,368 B1
DATED : March 19, 2002
INVENTOR(S) : Bernert et al.

It is certified that error appears in the above-identified patent and that said Letters Patent is hereby corrected as shown below:

<u>Title page,</u>
Item [75], Inventors, delete "Christoph" and substitute -- Christioph -- therefor.

<u>Column 7,</u>
Line 15, delete "11c" and substitute -- 114c -- therefor.

Signed and Sealed this

Third Day of June, 2003

JAMES E. ROGAN
*Director of the United States Patent and Trademark Office*